March 31, 1970 E. T. CARLSON 3,504,097
ELECTRICAL CONDUIT
Filed Oct. 22, 1968
6 Sheets-Sheet 1
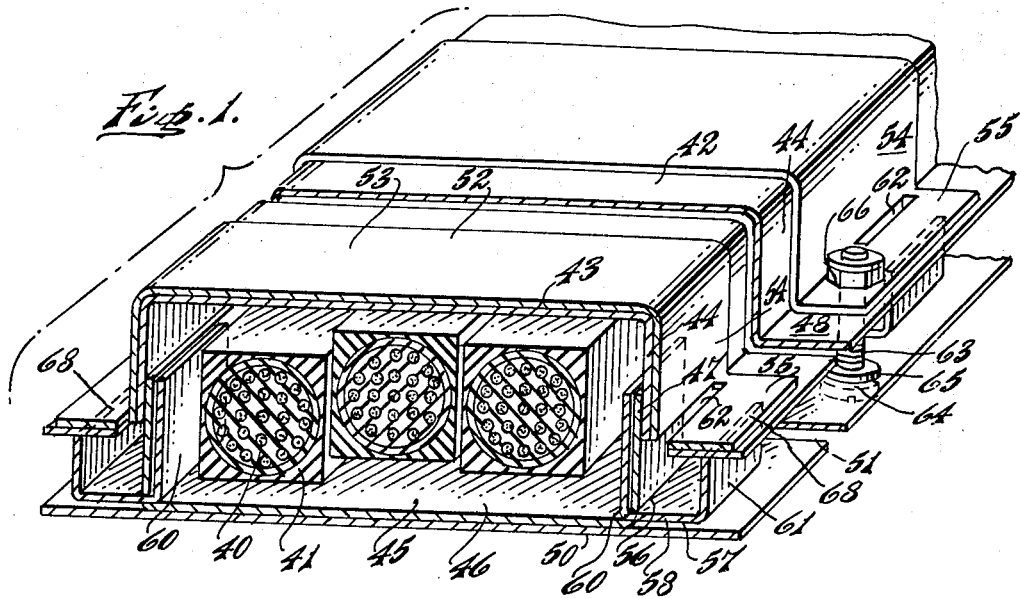
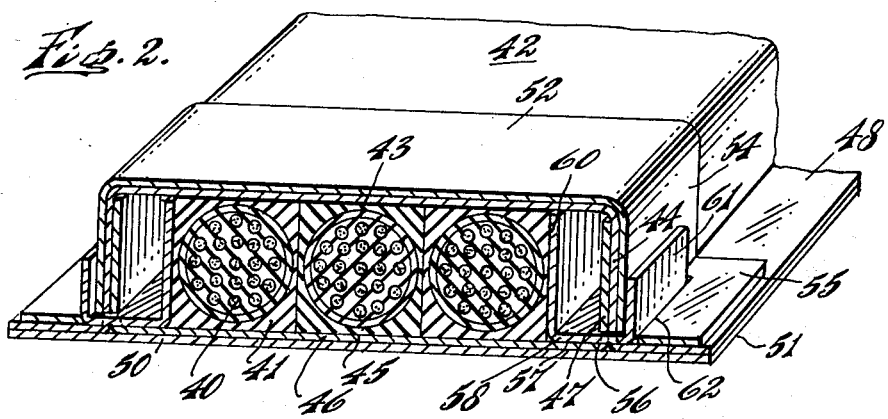
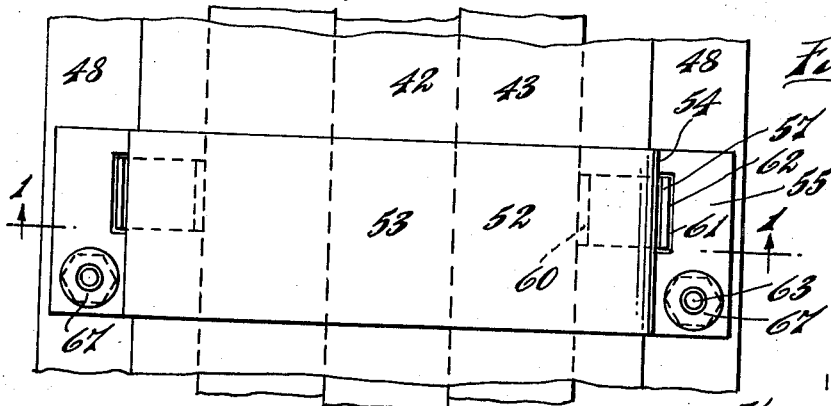
INVENTOR
Elmer T. Carlson
BY
ATTORNEYS

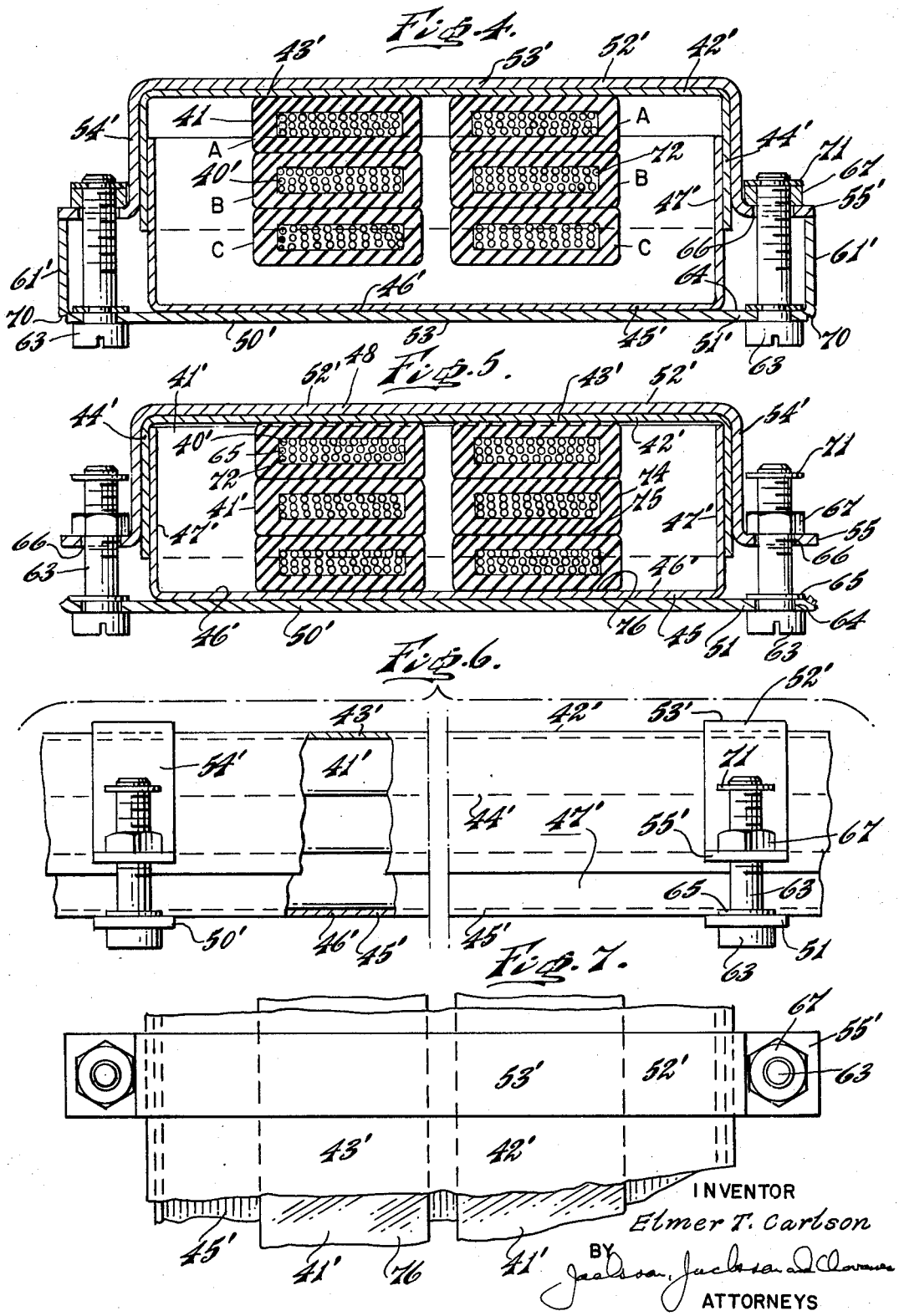

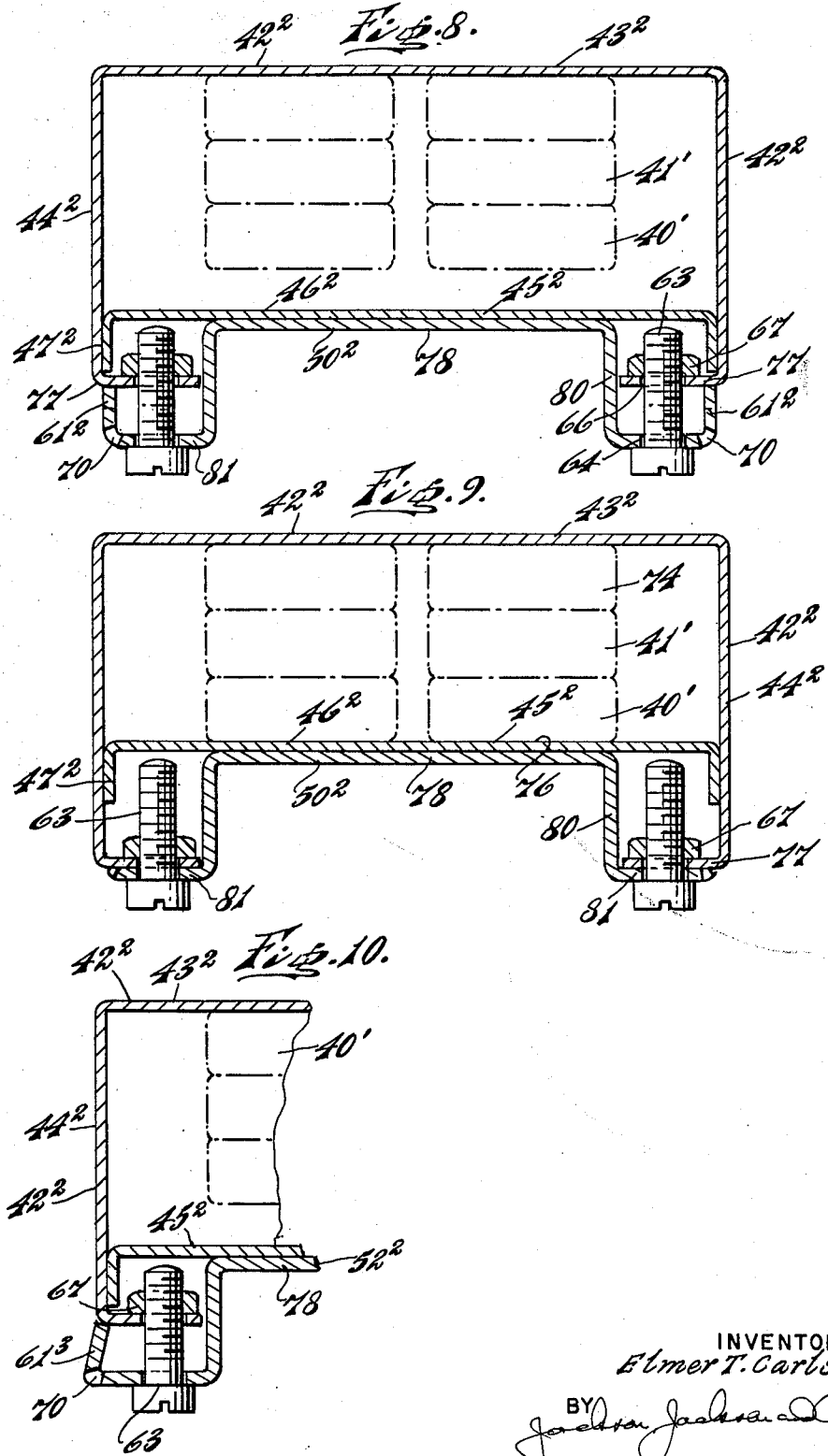

March 31, 1970
E. T. CARLSON
3,504,097
ELECTRICAL CONDUIT
Filed Oct. 22, 1968
6 Sheets-Sheet 4
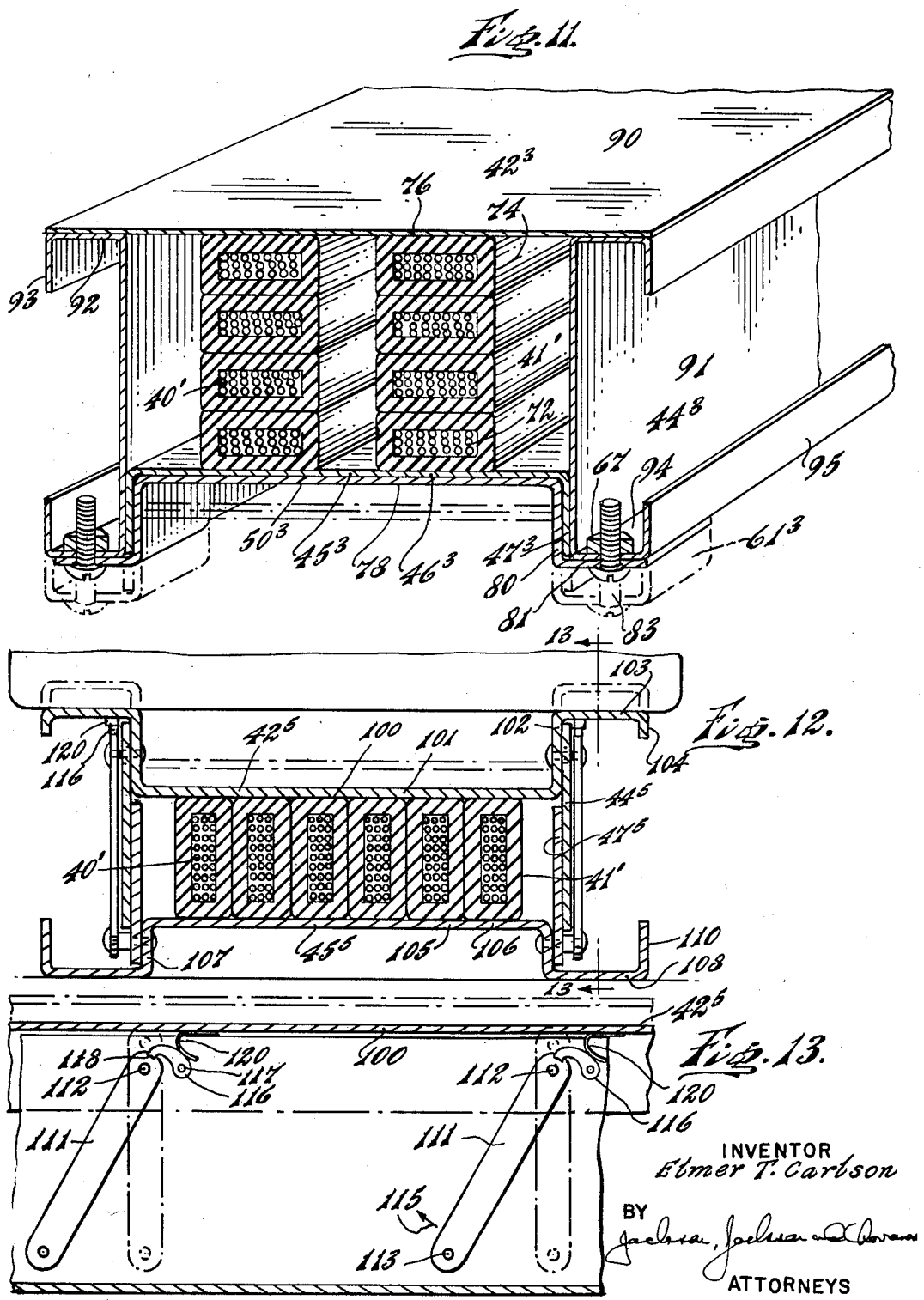
INVENTOR
Elmer T. Carlson
BY
Jackson, Jackson and Corcoran
ATTORNEYS March 31, 1970     E. T. CARLSON     3,504,097
ELECTRICAL CONDUIT
Filed Oct. 22, 1968     6 Sheets-Sheet 5
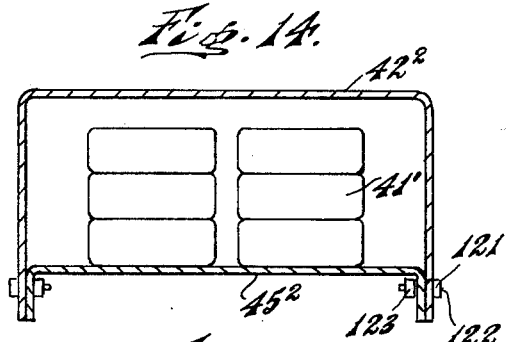
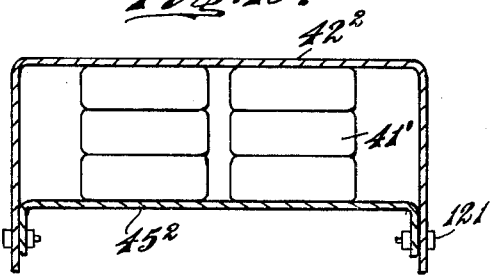
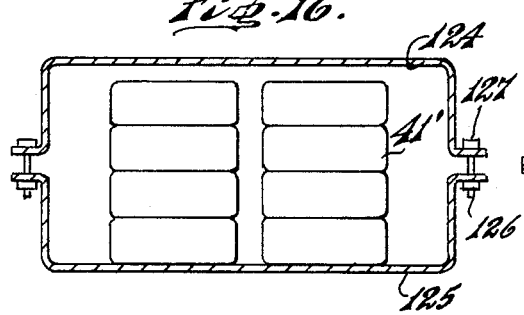
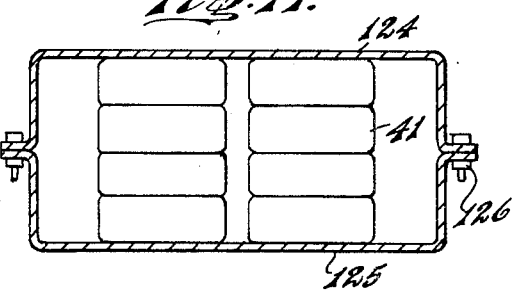
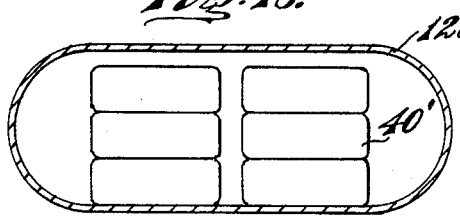
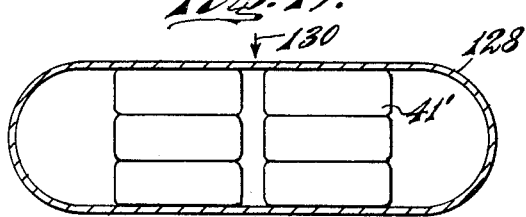
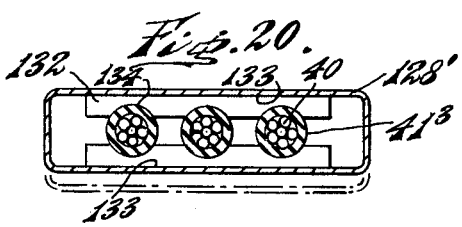
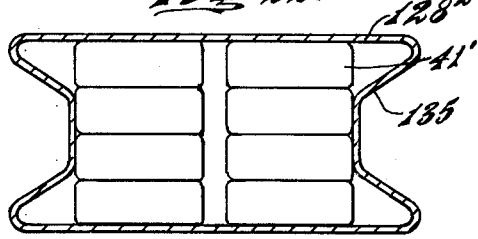
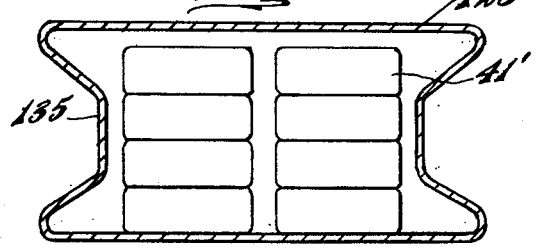
INVENTOR
Elmer T. Carlson
BY
ATTORNEYS March 31, 1970      E. T. CARLSON      3,504,097
ELECTRICAL CONDUIT
Filed Oct. 22, 1968      6 Sheets-Sheet 6
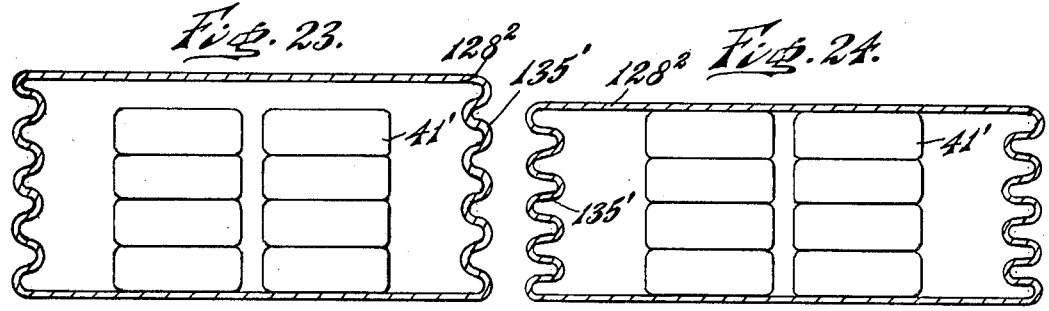
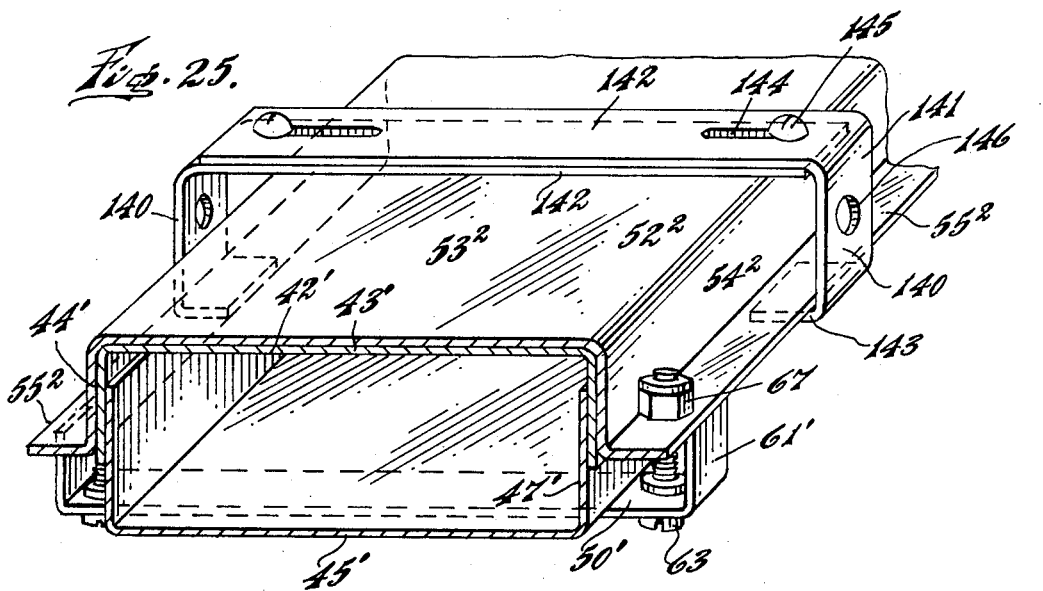
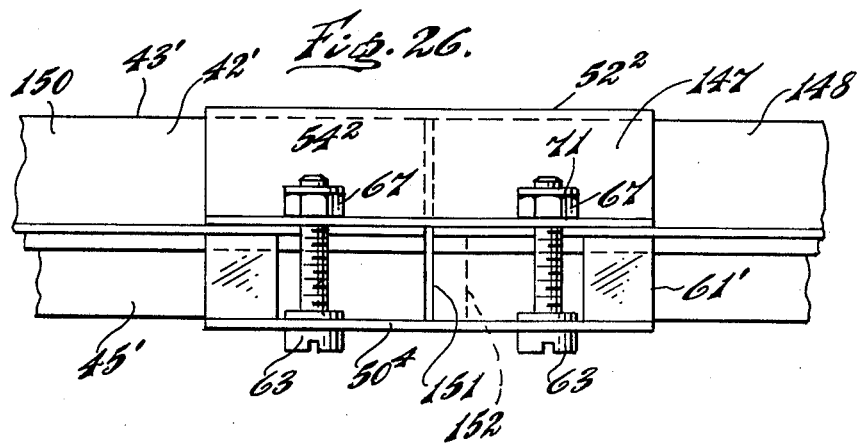
INVENTOR
Elmer T. Carlson
BY
ATTORNEYS

United States Patent Office 3,504,097
Patented Mar. 31, 1970

3,504,097
ELECTRICAL CONDUIT
Elmer T. Carlson, Center Valley, Pa., assignor to Broadhill Development Corporation, Granby, Conn., a corporation of Connecticut
Filed Oct. 22, 1968, Ser. No. 769,485
Int. Cl. H01b 7/36
U.S. Cl. 174—68
23 Claims

ABSTRACT OF THE DISCLOSURE

A conduit for multiple electric conductors, including sections of discrete length through which are threaded multiple conductors of indefinite length. The housing has an expanded position for threading the conductors through the conduit and a contracted position. In the contracted position rectangular walls of insulation are in direct contact with the housing. The housing conductors are stranded and flexible, and the insulation is rectangular to engage the inside of the conduit wall. The conductors may be rectangular to conform to the shape of the insulation. Members must be displaced or bent to contract the housing in the preferred form. The insulation on the conductors may be joined by adhesive to form cables.

DISCLOSURE OF INVENTION

The present invention relates to an electric conduit having sections joined end to end of predetermined length, and having multiple conductors of indefinite length threaded through the conduit.

A purpose of the invention is to provide a conduit which has an expanded position in which the conductors can be threaded through it and a contracted position in which the housing of the conduit is in engagement over a flat surface with the insulation on the conductors for improved heat transfer and low impedance.

A further purpose is to provide in the conduit a plurality of conductors with insulation which has rectangular form and which in contracted position of the housing is in engagement with the housing continuously lengthwise and over substantially the full width of one of the rectangular faces. It should be understood that when reference is made herein to the form or shape of the cross section of the conductor or the conductor insulation as rectangular, it is intended to include also forms and shapes which are square and come within the general description of rectangular.

A further purpose is to provide displaceable or bendable elements which must be removed in order to collapse the housing so that the contraction will not be made unintentionally or carelessly.

A further purpose is to employ conductors of stranded (woven or plated) form so as to obtain maximum flexibility, the conductors in same cases being of rectangular cross section, and provide the conductors with insulation of rectangular cross section which can improve heat transfer by engagement with opposed flat clamping walls of the housing.

A further purpose in transmitting relatively heavy currents, upwards of 200 amperes, is to use the material more economically and increase the safety by obtaining more effective heat transfer of heat losses to the housing and thus promote dissipation of heat generated by power losses.

A further purpose is to make the housing or enclosure act as protective enclosure and a continuous radiator and conductor for heat losses.

A further purpose is to obtain low voltage drop by providing rectangular conductors having rectangular insulation on them and place the insulation on adjoining conductors in close lateral engagement.

A further purpose is to conduct the heat from circular stranded conductors to a conduit housing by heat transfer means having opposed broad flat parallel faces which engage the housing, the heat transfer means also providing insulation.

A further purpose is to unite a plurality of insulated flexible conductors of rectangular outside shape by adhesive so that the conductors can form a cable or can be pulled apart as desired.

Further purposes appear in the specification and in the claims.

In the drawings I have chosen to illustrate several of the embodiments in which the invention may appear, selecting the forms shown from the standpoints of convenience in illustration, satisfactory operation and clear demonstration of the principles involved.

FIGURE 1 is a partially broken perspective, part of which is in transverse section on the line 1—1 of FIGURE 3, showing a preferred embodiment of the conduit of the invention in expanded position.

FIGURE 2 is a view similar to FIGURE 1 showing the conduit contracted.

FIGURE 3 is a fragmentary top plan view of the conduit of FIGURES 1 and 2.

FIGURE 4 is a transverse section of further embodiment of the conduit according to the invention, shown in expanded form.

FIGURE 5 is a view corresponding to FIGURE 4 shown in collapsed form.

FIGURE 6 is a fragmentary side elevation of the conduit of FIGURES 4 and 5.

FIGURE 7 is a fragmentary top plan view of the conduit of FIGURES 4 to 6.

FIGURE 8 is a transverse section of a modified conduit of the invention shown in expanded form.

FIGURE 9 is a view corresponding to FIGURE 8 showing the conduit collapsed.

FIGURE 10 is a fragmentary transverse section of a modified conduit of the invention shown in expanded form.

FIGURE 11 is a transverse section of a modified conduit according to the invention illustrated in collapsed form, the expanded form being shown by dot-and-dash lines.

FIGURE 12 is a transverse section showing a modified conduit of the invention in collapsed form, the expanded form being suggested by dot-and-dash lines.

FIGURE 13 is a section of FIGURE 12 on the line 13—13.

FIGURE 14 is a diagrammatic illustration in transverse section of a modification of the invention shown in expanded form.

FIGURE 15 is a view corresponding to FIGURE 14 shown in collapsed form.

FIGURE 16 is a modified conduit of the invention shown in transverse section and in expanded position.

FIGURE 17 is a view corresponding to FIGURE 16 shown in collapsed position.

FIGURE 18 is a transverse section of a further modification of the invention shown in expanded form.

FIGURE 19 is a view corresponding to FIGURE 8 in collapsed position.

FIGURE 20 is a modification of the conduit of the invention shown in collapsed form, the expanded form being suggested by dot-and-dash lines.

FIGURE 21 is a further modification of the invention shown in expanded form.

FIGURE 22 is a conduit according to FIGURE 21 shown in collapsed position.

FIGURE 23 is a transverse section of a further modification of the invention shown in expanded position.

FIGURE 24 is a view corresponding to FIGURE 23 in collapsed position.

FIGURE 25 is a fragmentary sectional perspective of a modified form of the invention shown with a hanger, being illustrated in expanded position.

FIGURE 26 is a fragmentary side elevation through a joint in conduit sections shown in expanded position.

Describing in illustration but not in limitation and referring to the drawings:

The present invention is primarily concerned with feeders for transmitting alternating electric current, although they may be used for direct current. Heat losses in AC feeders are determined by the effective AC resistance of the conductors multiplied by the square of the current. Since there are limitations on permissible temperature rise, limitations on the amount of current which can be conducted are imposed by the ambient temperature, and the effectiveness of the feeder in dissipating heat.

Since the present invention is concerned with conduits, it is important to consider mainly three aspects, namely, the conduit housing, the conductors and the joints between housing sections.

Round conductors covered with round insulation which are placed within a conduit are very unfavorable from the standpoint of heat elimination and also voltage drop. From the standpoint of heat dissipation, there is a relatively large dead air space in the conduit which acts as a thermal block. In a conduit having less than four conductors, the poor heat dissipation results in a derating under the National Electric Code of 40% as compared to wires carried in open air. In other words, it is necessary to use a corresponding increase in cross section of electrical conductor in order to conduct the same current in a conduit as compared with open wires. Where more than six conductors are being used in the conduit, the derating is even more than 40%.

From the standpoint of voltage drop, round wires are also unfavorable because a spacious conduit permits wide center-to-center distance which causes high impedance.

Because of this derating factor in the past, armored cables have been used in which circular wires are wrapped with spiral flexible steel or aluminum bands. Somewhat higher ratings are permitted for such cables than for conduits.

Extensive use has been made of busways to eliminate some of the disadvantages of conduits. Busways involve many of the same thermal blocks that are present in conduits. They have, however, in many cases low voltage drop. Busways are permitted approximately the same current carrying capacity as open wire. Major defects in busways, however, are the need to connect the conductors at the end of each section, the possibility that the conductor joints at the ends of the sections might become loose, and the need for special fittings when one section is not extending in prolongation of the other.

The conduit of the invention eliminates this defect of busways because the conductors can extend indefinitely as wires in conduit, and need not be connected at the end of each section.

In busways rigid bars of ribbon or rectangular section are well known in the art, provided with insulation of rectangular cross section and in some cases engaging the inside of the housing, as in Johnson et al. U.S. Patent 3,034,753, granted May 15, 1962, for a Busway Hanger; Atkinson U.S. Patent 3,122,603, granted Feb. 25, 1964, for Busway Plug Clamp; and my U.S. Patent 2,411,128, granted Nov. 12, 1946 for Bus Bar System. Unlike these prior art devices, however, it is important in the present invention that the conductors be flexible, so that they can be threaded through the conduit when in expanded position, and accordingly I employ stranded conductors. I intend this term to include conductors which are woven or braided of individual strands.

My invention, therefore, offers several advantages over the devices of the prior art. There is lower temperature rise than in the case of round wires surrounded by round insulation which are in a conduit. Furthermore, the voltage drop is lower than in the case of wires in a conduit. As compared with wires threaded through a conduit, there is an increase in current carrying capacity of 35% by the invention. Furthermore, vertical riser supports are eliminated and these are necessary with conduits.

As compared to bus ducts the invention also offers advantages. The conduit of the present invention has a higher short circuit strength than a busway. The conduit of the inventon in collapsed form is 20% smaller than a corresponding busway. The conduit of the invention is of lower cost than a busway. Installation cost is less because it is not necessary to connect the conductors at the ends of each section. Special fittings at the ends of the sections are also eliminated in a conduit but are necessary in a busway.

The conduit of the invention lends itself to a wide thin cross section which is favored in building construction.

The conduit of the invention can accommodate a large range of rectangular wire assemblies for electric transmission of AC or DC up to a voltage of the order of 600 volts or higher.

In the present invention, there are two main groups of embodiments. The preferred form is one in which the housing sections laterally telescope and can be held apart or can be clamped together. In order to prevent unintentional collapsing, the conduit is preferably provided with knockouts or displacement elements which must be moved or removed in order to collapse or telescope the sides of the housing.

Another group of embodiments of the invention contemplate a conduit which can be collapsed laterally and will take a permanent set holding its walls in collapsed position. This form lacks the advantage of the telescoping form because it cannot be so readily expanded to remove the wires, although where air-tight joints are used, expansion can be accomplished by introducing compressed air or compressed gas.

It will be evident that the conductors will run for indefinite lengths, in many cases the full length of the feeder, or as desired. The conductors being stranded and flexible can be wound on reels and pulled through the conduit using standard techniques. The conduit sections, however, are rigid and should be of finite length, convenient lengths being 10, 15 or 20 feet as desired.

The conduit of the invention can take many different shapes. Since it will be necessary to pull or thread conductors through it, its interior should be smooth and free from imperfections which would scrape against or impede the pulling through of conductors or would tend to scrape insulation from conductors.

The housing may conveniently be made of steel, suitably coated or protected against corrosion, or of aluminum. Sheet metal gages such as 16 gage will often be suitable. It should be strong enough to provide protection for the conductors and also clamp them for purposes of heat transfer and connect to supports such as bolts, lag screws or the like.

The individual conductors in the conduit may be wholly separate conductors, which may or may not be arranged in groups or stacks, or the conductors may be joined or cabled as by adhesive as later explained. The conductors in the conduit may be arranged to provide a vertical group wire feeder, a group phase feeder having horizontal wires, or a paired phase feeder having vertical or horizontal wires. Any suitable stranded conductors such as copper or aluminum conductors may be used, although the conductors should preferably be of rectangular section.

The conduit when compressed should be dust-tight and should exclude moisture, and in the form is suitable to be included in concrete or concealed wall construction. While it may not be necessary to do so, the conduit in the preferred form is capable of being expanded to withdraw individual conductors.

In the preferred embodiment as shown in FIGURES 1 to 3, a plurality of stranded conductors 40, suitably of copper or aluminum, each is surrounded by insulation 41 which is of rectangular exterior cross section, in the case shown being substantially square. While each conductor 40 has a generally circular cross sectional contour, the space around the conductor is filled in with electrical insulation, suitably of relatively high heat conductivity, so that heat can be conducted to the interior surfaces of the conduit wall without passing through the air.

The conduit itself desirably consists of an upper inverted channel portion 42 extending conveniently the full length of the conduit section, and having a base of the U 43 and arms of the U 44 extending downwardly therefrom. The lower portion of the conduit comprises a bottom channel portion 45 desirably extending the full length of the conduit and comprising a base of the U 46 and upstanding channel arms 47 which telescope with arms 44 of the upper channel portion.

The downwardly extending arms 44 of the upper channel portion have connected to them outwardly flaring flanges 48 and these are opposed in parallel relation by a bottom plate 50 which is secured as by spot welding to the base of the U 46 of the bottom channel portion 45 and has outwardly extending portions 51 opposed to the outwardly flaring flanges 48.

At suitable intervals where required to gain stiffness, upper clamps 52 of inverted channel shape conform generally to the upper channel portions 42. A base of the U 53 of the upper clamp are united as by spot welding to the base of the U 43 of the upper channel portion, and channel arms 54 of the upper clamp are united as by spot welding to the channel arms 44 of the upper channel portion 42. The upper clamp 52 also has outwardly flaring end portions 55 which are united as by spot welding to the outwardly flaring flanges 48 of the upper channel portion of the conduit.

Near the base of the U of the bottom channel portion 45 at each side and extending for a short distance longitudinally, there is a slot 56. An inverted U-shaped spacer and side clamp 57 extends through this slot at each side of the conduit, and includes a base of the U 58 which rests on and is slidable with respect to the base of the U 46 of the bottom channel portion and the outwardly extending portion 51 of the plate 50, a relatively long clamping arm 60 which extends parallel to the telescoping flanges 44 and 47, and a spacer arm 61 which in expanded position of the conduit performs a spacer function to prevent the conduit portions from coming together.

Through the flaring flange 48 of the top channel portion 42 and through the flaring flange 55 of the top clamp, there is at each side a slot 62 close to the side flanges 54 which is to receive the spacer flange 61 in collapsible position as the side clamp and spacer 56 moves inward.

In order to space the telescoping parts of the housing in expanded position and to clamp them in collapsed position, at intervals along the housing on each side bolts 63 extend through holes 64 in the outwardly extending portion 51 of the plate 50, the bolt being rotatable with respect to the plate 50 but longitudinally restrained by providing on the opposite side from its head a snap ring 65 entering a suitable slot in the bolt as well known. The outwardly flaring flange 48 of the top channel portion of the conduit and the cooperating outwardly flaring flange 55 of the top clamp have cooperating holes 66 through which the bolt passes, and at the opposite side from the head the bolt makes threaded engagement in a nut 67 which is secured to the top clamp as by welding.

In the expanded position as shown in FIGURE 1, the individual conductors are widely spaced from the top and bottom walls of the conduit and also from the side walls as shown, the bolts holding the channel portions of the conduit apart and the channel portions being prevented from unintentional collapse by the spacer arms 61 which abut against the under portion of the flaring flanges 48, as best seen at 68. The side clamping arms 60 are then at this point widely spaced to leave ample room to thread the conductors through the conduit.

In order to hold the spacers firmly, the bolts can be slightly tightened so that the spacer arms 61 are tightly held in place.

Continuous flaring flanges 48 provides a means for attaching clamps on hangers at suitable locations during initial installations without interfering with the subsequent collapsing of the conduit containing conductors.

When it is desired to collapse the conduit, the bolts 63 are slightly loosened and the U-shaped combined side clamps and spacers 57 are pushed toward one another until the spacer arm 61 can enter the collapsing slots 62. At the same time the side clamping arms 60 engage straight side surfaces on the insulation 41 holding the conductors into firm lateral engagement and aiding in heat transfer from the conductor insulation through the clamping arms 60 to the outside of the housing. In this position the bolts 63 can be tightened and as this occurs, the opposite channels of the conduit telescope until the base of the U 43 of the top channel engages one straight outer face of the insulation of each conductor and the base of the U 46 of the opposite channel engages the opposite straight side of the conductor insulation, providing improved heat transfer directly to the outer walls of the conduit. This engagement extends throughout each section of the conduit from end to end and there is not a problem of transferring heat through dead air space in order to cool the conductors. In FIGURES 1 to 3, the straight sides of the conductor insulation are laterally in engagement with one another or with the side clamps 60, further aiding in heat transfer and gripping the conductor insulation firmly. Furthermore, the lateral engagement of the conductors provides lowest voltage drop.

Referring to the form shown in FIGURES 4 to 7 the conduit comprises a housing which is made up of an upper channel portion 42' and a lower channel portion 45' extending from end to end of the housing. The upper channel portion 42' has a base of the U 43' and arms 44'. The lower channel portion has a base of the U 46' opposing and parallel to the base of the U 43' and has arms 47' which telescope with and are capable of sliding along the flanges 44' to make a tight seal. At intervals along the housing, suitably every few feet and at the ends there are provided upper clamps 52'. In this form the upper clamps 52' comprise a hat section which has a base of the U 53' which extends straight across and is secured as by welding to the upper channel portion 42' along with side arms 54' which engage along the outside of the arms 44' of the upper channel portion 42' and are secured to it by welding, as well as outwardly flaring end portions 55'. At the opposite side of the clamp a strip 50' extends straight across along the base of the U 46' of the lower channel portion 45' and protrudes out at 51' opposite and parallel to the flaring portion 55'. Extending up from the protruding portion 51' at the end of the strip 50 in expanded position as shown in FIGURE 4 is a knockout or breakoff portion 61' joined to the protruding portion 51' by a perforated or notched portion 70. The flaring portions 55' of the clamp portion 52 have holes 66 extending therethrough and the outwardly flaring portions of the cooperating clamp strip 50' have cooperating holes 64 passing therethrough. A bolt 63 has its head on the opposite side of the clamp strip 50', the hole 64 being too small to permit the head to pass. At the opposite side the bolt is held in rotatable relationship with the strip 50' by a snap washer 65 entering into a suitable slot in the bolt. The flaring portion 55' of the clamp 52' has a captive nut 67 secured thereto as by welding, the bolt 63 being threaded through the nut. A snap retaining washer 71 in a suitable slot near the end of the bolt prevents the bolt from being unintentionally removed.

Suitable conductors 40' are threaded through the conduit in its expanded position as shown in FIGURE 1, each of the conductors being made of strands 72 arranged in rectangular form in cross section with a wide rectangular side and a narrow rectangular side and covered with insulation 41' of rectangular form. The conductors as shown are arranged in two stacks and bear designations A, B and C to indicate a possible arrangement of the circuits. With the conduit expanded as in FIGURE 1, the conductors are threaded through in any desired arrangement.

Then the clamps are compressed, first breaking off the knockout or breakoff portions 61' so that the clamps can be closed, and then tightening the bolts to the condition of FIGURE 2. In this form each stack 74 of insulated conductors has the wide cross sectional sides 75 in engagement in the middle of the stack and the top and bottom wide cross sectional sides 76 are in contact side to side with the housing portions 43' and 46', for effective heat transfer.

Where permissible, the insulator faces 75 may be joined by a layer of adhesive such as pressure sensitive adhesive which will hold the stacks 74 in the form of a cable. If desired, one or more conductors can be pulled away as for example to lead out to make connection.

FIGURES 8 and 9 show a modified device of the invention in which the upper channel $42^2$ has a base of the U $43^2$ and arms $44^2$. In this case the arms $44^2$ have inwardly bent portions 77 near their ends. Cooperating with the channel portion $42^2$ is an inverted channel portion $45^2$ having a base of the U $46^2$ and flanges $47^2$ which telescope with and slide along the flanges $44^2$. At clamping locations a bottom clamp portion $50^2$ extends across but is of channel formation, having a base of the U 78 which extends straight across the base of the U $46^2$ and is welded to it. Near the ends there are downwardly extending flanges 80, diverging portions 81 and breakoffs or knockouts $61^2$ connected to the ends by perforations and extending toward flanges 77. Holes 66 extend through the inwardly directed portions 77 of the housing portion $42^2$ and aligned holes 64 extend through the diverging portions 81 of the clamp member $50^2$. Captive nuts 67 are secured to the inwardly protruding portions 77 as by welding and bolts 63 pass through the holes 64 and 66. The device is shown expanded in FIGURE 8 with the conductors 40' threaded through and in FIGURE 9 the breakoffs $61^2$ have been removed and the bolts have been tightened on both sides and along the length so that the top and bottom broad faces of the insulation on the stacks of conductors 74 are in firm engagement with the outside walls of the housing as at 76 to assure excellent heat transfer, thus using the housing as a radiator and heat conductor.

In the form of FIGURE 10 the breakoffs $61^3$ are bent in to prevent contraction of the conduit. They can either be broken off or bent out slightly so as to permit tightening the bolts 63.

In FIGURE 11 the housing portion $42^3$ making up the upper part consist of a flat top plate 90 and side channels 91, each of which has a base of the U forming a telescoping side wall $44^3$, a top flange 92 which is secured as by spot welding to the top plate 90 and a downwardly extending stiffening flange 93 therefrom, a bottom flange 94 and an upwardly extending stiffening flange 95 therefrom. These stiffening flanges also act like radiator fins to dissipate heat.

Cooperating with the upper portion of the housing $42^3$ is a lower portion $45^3$ of that section comprising a base of the U $46^3$ and telescoping side flanges $47^3$. At clamp locations distributed along the conduit, lower clamps $50^3$ are provided consisting of bases of the U 78 secured to the lower channel portions $45^3$ as by welding, and having arms of the U 80 which engage and are secured as by welding to the telescoping arms $47^3$ of the lower channel portion. From the arms 80 extend diverging flanges 81 and at the ends these provide break-off portions $61^3$. The bolts 63 and the nuts 67 act as previously described to contract the conduit and tightly engage top and bottom flat walls 76 of the conductor insulation. The outwardly diverging flanges at the top and bottom of the stiffener flanges are very convenient for connecting to the overhead structure or hangers and permit this conduit, as well as any of the others, to be disposed horizontally, on its side or upside down as desired.

In the form of FIGURES 12 and 13 the top channel portion $42^5$ is a composite made up of a top channel 100 having a generally horizontal portion 101 (in the position shown), upwardly extending arms 102, lateral extending flanges 103 and downwardly extending stiffening flanges 104. Side arms of the U $44^5$ are secured as by spot welding to the upwardly extending arms 102. The lower channel portion $45^5$ is also made up of separate members, consisting of a bottom channel portion 105 having a base of the U 106, downwardly extending side arms of the U 107, outwardly extending flanges 108 and upwardly extending stiffener ribs 110. The side arms of the channel are separate elements $47^5$ joined as by spot welding to the arms of the U 107 and telescoping with the cooperating side arms $44^5$ of the upper channel portion.

The upper and lower channel portions are connected by a plurality of parallel pivot arms 111 pivoted to the upper channel portion $42^5$ at 112 and pivoted to the lower channel portion $45^5$ at 113. In order to contract the conduit walls and engage the insulation 41' on the conductors 40' in firm engagement with the housing, it is necessary to relatively shift the channel sections of the housing longitudinally as suggested by the arrow 115, bringing them to a position in which latches 116 pivoted at 117 on the upper channel portion $42^5$ are able to engage in latching recesses 118 in the pivoted arms 111 under the action of leaf springs 120.

In the form of FIGURES 12 and 13 the conductors are stranded and they and their insulation are of rectangular cross section but the conductors engage directly against the inner surface of the housing walls on their narrow rectangular faces and engage one another on their broad faces in collapsed position.

FIGURES 14 and 15 indicate a simpler shape for the parts of the housing rather like FIGURES 8 and 9, consisting of an inverted channel $42^2$ cooperating with another inverted channel $45^2$ and having telescoping relation at 121 at the sides. Bolts 122 extend through slots in the sides and engage nuts 123 holding the housing expanded as in FIGURE 14. When the housing is contracted as under the pressure of jacks after loosening the bolts, the housing can be held in its contracted position by again tightening the bolts to bring pressure on the stacks of conductors as shown in FIGURE 15.

In the form of FIGURES 16 and 17 cooperating hat sections 124 and 125 are held in spaced relation by bolts 126 cooperating with nuts 127 as shown in FIGURE 1 and when pulled together as shown in FIGURE 17 the bolts close the seam at the side and clamp the insulation on the conductors.

In some cases it is desirable to use conduits which are integral but which can be compressed under jacks and take a permanent set. In FIGURE 18 the housing 128 is seamless or welded and has a flat top and flat bottom relatively spaced from one another to provide ample room to thread the conductors $40^1$ through it. In FIGURE 19 the housing has been compressed as by applying jacks as shown by the arrows 130 and 131 so that the insulation on the conductors is tightly engaged at the top and bottom. The metal of the housing takes a permanent set and holds this clamping relation.

FIGURE 20 shows a form of the invention in which round stranded conductors 40 are used having round insulation $41^3$ thereon. Heat transfer elements 132 have flat faces 133 engaging the horizontal gripping walls of the conduit 128¹ and have curved grooves 134 conforming to the circular insulation on the conductors. The heat transfer elements may be of metal such as aluminum extrusions or they may be of a plastic giving favorable heat conductivity such as polyvinyl chloride containing metal powder compounded therein. They desirably extend continuously therein. When the jack compresses the housing it will be evident that tight engagement is obtained between the sides of the conductor insulation adjoining the housing, the heat transfer elements and the opposed parallel faces of the housing.

FIGURES 21 and 22 show a form similar to FIGURES 18 and 19 having an integral housing 128², except that at the sides the metal is fluted at 135 so that better compliance can be obtained in making a contraction as in FIGURE 22 under the action of the jacks to push the top and bottom walls into tight engagement with the conductor insulation.

FIGURES 23 and 24 show a further modification in which several flutes 135¹ are introduced on the sides to permit better compliance in collapsing the structure.

FIGURE 25 shows a variation of the conduit of the invention after the manner of FIGURES 4 to 7. In this case the essential structure of FIGURES 4 to 7 is provided except that at a suitable position along the length of the conduit, or continuously if desired, the top clamp shown at 52¹ in FIGURES 4 to 7 is elongated as shown in FIGURE 25 at 52² providing an elongated base of the U, united as by spot welding to the corresponding part of the upper channel portion 43¹, elongated arms of the U 54² and elongated diverging flanges 55². A hanger attachment is provided, consisting of opposing U-shaped members 140 each having a base of the U 141, an arm of the U at 142 which lies against a corresponding arm of the U of the opposite hanger member, and a parallel arm of the U 143 which engages under the diverging flange 55² at each side and supports the conduit. One of the U arms 142 has elongated slots 144 and the other corresponding U arm has openings which receive screws 145 extending through the slots 144 and holding the hanger in a suitable adjusted position. By loosening the screws 145, and pulling the opposing bases of the U 140 far apart it is possible to insert the hanger at any location along the conduit and then by pushing the bases of the U 140 together and tightening the screws 145 the hanger can be held in its adjusted position.

Openings 146 extend through the bases of the U 141 for engagement with any suitable overhead structure, which may be a tie rod, hooks, wire, or the like.

The form of FIGURE 26 shows a typical end connection between conduit sections. This particular form is an adaptation of the form of FIGURES 4 to 7. As shown in FIGURE 25, the top clamp 52² is elongated and half of the length of it is secured as by spot welding at 147 to one channel section 148. The other half of the top clamp extends over the upper channel portion 42² of an adjoining channel section 150. The lower clamp 50⁴ is in this case elongated to bridge both channel sections and is secured as by spot welding to channel section 148. The slight gap which would otherwise exist at the ends of the channel sections in the lower part of the conduit as shown at 151 is closed by providing a longitudinally extending metallic flap on the inside of the innermost of the telescoping sides, terminating at 152.

The conduit of the invention is best employed with conductors of round cross section having insulation of rectangular cross section as shown in FIGURE 1, but it can also be employed very effectively with conductors of rectangular cross section having insulation of rectangular cross section. The invention will permit supporting conductors in a vertical run using smaller conductor cross section, and increasing the number of conductors in a single conduit without derating. Top and bottom conductor in a stack of conductors can be observed without pulling out other conductors.

If desired the break off flanges can be provided with gage marks showing the proper width of spacing of the conduit walls for drawing certain wires through the conduit and showing the proper tightening required for engagement with certain wires. In this case the break off projections will be only partly broken off as required.

The following table gives amperes per square inch current density comparison for 1000 ampere load using aluminum conductors.

OPEN WIRE
1820
ROUND WIRE IN CONDUIT
1000
ENCLOSED BUSWAY
1000
VENTILATED BUSWAY
1350
CONDUIT OF INVENTION
1350

Having thus described my invention what I claim as new and desire to secure by Letters Patent is:

1. In an electrical conduit, a plurality of stranded insulated conductors of indefinite length each having, in intimate continuous heat transfer relation with a plurality of conductors, heat transfer means having opposed parallel rectangular faces, a housing of limited length surrounding the conductors, having an expanded position in which the conductors can be threaded through the housing, and a contracted position in which parallel rectangular surfaces of the heat transfer means engage outer walls of the housing and means for collapsing the walls of the housing from hthe expanded to the contracted position.

2. A conduit of claim 1, in which the conductors and their insulation are of rectangular cross section, broad faces of insulation on certain conductors engaging broad faces of insulation on certain other conductors, and broad parallel faces of insulation on certain conductors engaging the outside walls of the housing and acting as heat transfer means in contracted position.

3. A conduit of claim 1, in which the conductors and their insulation are of circular cross section, and the heat transfer means engages the circular insulation on one face and engages the outer walls of the housing on another face in contracted position.

4. A conduit of claim 1, in which the conductors are circular, and their insulation is rectangular and functions also as the heat transfer means.

5. A conduit of claim 1, in which the opposing walls of the housing are in telescopic relationship and the telescopic portions relatively seal in both expanded and compressed position.

6. A conduit of claim 1, in which the means for collapsing the walls of the housing comprises screw means engaging opposed sides of the housing at points distributed along its length and adapted to hold the housing selectively either in expanded or contracted position.

7. A conduit of claim 6, in combination with detachable means for holding the walls of the housing in expanded position.

8. A conduit of claim 1, in which the means for collapsing the walls of the housing includes detachable means for holding the walls of the housing in expanded position.

9. A conduit of claim 1, which is in unitary form, in which the means for collapsing the walls of the housing collapses the housing so that its walls take a permanent set and hold the conduit collapsed against rectangular surfaces of the heat transfer means to improve the heat transfer between the conductors and the housing.

10. A conduit of claim 1, in which the walls of the housing include side walls which are fluted in cross section and which are adapted to take a permanent set when pressed together by the means for collapsing so as to hold the opposed rectangular faces of the heat transfer means in contact with the walls of the housing.

11. In an electrical conduit, a plurality of stranded insulated conductors of indefinite length, the cross section of the outside of the insulation of the conductors being of rectangular shape, a housing of limited length surrounding the conductors, having an expanded position in which the conductors can be threaded through the housing, and a contracted position in which parallel rectangular surfaces of the insulation on the conductors engage inside surfaces of outer walls of the housing, and means for collapsing the walls of the housing from the expanded to the contracted position.

12. A conduit of claim 11, in which the conductors are of circular cross section and opposed parallel surfaces of the insulation on each conductor are engaged by opposed walls of the housing.

13. A conduit of claim 11, in combination with lateral clamping means extending outside the housing and effective within the housing to engage side rectangular surfaces of the insulation of the conductors.

14. A conduit of claim 11, in combination with means for holding the housing in expanded position and cooperating means accessible outside the conduit for applying pressure to the rectangular side walls of the sidemost conductors and concurrently permitting collapsing of the housing.

15. In an electrical conduit, a plurality of stranded conductors each having insulation about them, the conductors and their insulation being of rectangular configuration, the insulation on the conductors engaging one another on their broad faces, and the conductors being of indefinite length, a housing of limited length surrounding the conductors, having an expanded position in which the conductors can be threaded through the housing, and having a contracted position in which rectangular faces of the insulation on the conductors engage the walls of the housing, and means for collapsing the walls of the housing from the expanded position to the contracted position in which the walls of the housing engage the insulation on the conductors.

16. A conduit of claim 15, in which the conductors are arranged in stacks within the conduit.

17. A conduit of claim 15, in which the conductors are arranged in stacks within the conduit and in which they engage the walls of the housing on the broad rectangular faces of their insulation.

18. A conduit of claim 15, having a first housing portion of channel shape, a second housing portion of channel shape telescoping with the first housing portion and sealing with respect to it, and the means for collapsing includes cooperating first clamp portions distributed along the housing and secured to one housing portion, second clamp portions secured to the other housing portion, and screw means interconnecting the first and second clamp portions and capable of maintaining an expanded position or a contracted position.

19. A conduit of claim 18, in which the screw means comprise a bolt rotatably secured to one clamp portion and a nut cooperating therewith secured to the other clamp portion and capable of maintaining a predetermined spacing between the housing portions.

20. A conduit of claim 19, having opposite telescoping housing parts, in which the means for collapsing the housing includes lever means interconnecting the opposed housing portions.

21. A conduit having a plurality of stranded rectangular conductors of indefinite length arranged in a stack or stacks, the conductors being provided with insulation whose external cross section is rectangular, the conductors of each stack being intimately associated together to reduce AC impedance to a minimum, in combination with a housing surrounding the conductors and sub-divided into sections of shorter length than the conductors, which sections are interconnected end to end, the housing having an expanded position in which the conductors can be threaded through the housing and a contracted position in which rectangular faces of the top and bottom insulation on the conductors in each stack is in intimate engagement with the outside walls of the conduit housing, the conductors also being in contact with each other on rectangular faces for maximum heat transfer and minimum geometric distance.

22. A conduit of the claim 21, in which in each stack the conductors are in contact with one another on their broad rectangular insulation faces and the top and bottom conductors are in contact with the housing on their broad rectangular insulation faces.

23. A conduit of claim 21, in which the insulation of the conductors in each stack is adhesively bonded together, the conductors being capable of being separated by pulling apart the adhesive.

References Cited
UNITED STATES PATENTS

| | | |
|---|---|---|
| 2,303,999 | 12/1942 | Huguelet. |
| 2,411,128 | 11/1946 | Carlson. |
| 3,187,086 | 6/1965 | Moodie et al. |
| 3,347,975 | 10/1967 | Shannon. |

LARAMIE E. ASKIN, Primary Examiner

U.S. Cl. X.R.

174—16, 99